(12) United States Patent  
Arcati (10) Patent No.: US 8,869,820 B2  
(45) Date of Patent: Oct. 28, 2014

(54) POLY-METAL HOSE REEL WATER SYSTEM

(75) Inventor: Peter Arcati, Dillsburg, PA (US)

(73) Assignee: The Ames Companies, Inc., Camp Hill, PA (US)

( * ) Notice: Subject to any disclaimer, the term of this patent is extended or adjusted under 35 U.S.C. 154(b) by 818 days.

(21) Appl. No.: 13/082,435

(22) Filed: Apr. 8, 2011

(65) Prior Publication Data

US 2011/0180158 A1     Jul. 28, 2011

Related U.S. Application Data

(63) Continuation-in-part of application No. 12/270,891, filed on Nov. 14, 2008.

(60) Provisional application No. 61/002,997, filed on Nov. 14, 2007.

(51) Int. Cl.
*B65H 75/34* (2006.01)
*B65H 75/40* (2006.01)
*B65H 75/44* (2006.01)

(52) U.S. Cl.
CPC .......... *B65H 75/4478* (2013.01); *B65H 75/403* (2013.01); *B65H 2701/33* (2013.01)
USPC ............ 137/355.27; 137/355.16; 137/355.26; 285/305; 285/319

(58) Field of Classification Search
CPC ............................. B65H 2701/33; B65H 75/38
USPC ............. 137/355.12, 355.16, 355.26, 355.27; 285/305, 308, 319, 320
See application file for complete search history.

(56) References Cited

U.S. PATENT DOCUMENTS

| 2,590,963 | A | * | 4/1952 | Hannay ...................... 242/403.1 |
| 2,752,198 | A | * | 6/1956 | Crow ........................ 137/355.26 |
| 3,286,502 | A | | 11/1966 | Cogan |
| 3,587,626 | A | * | 6/1971 | Cowley et al. ........... 137/355.12 |
| 5,628,531 | A | * | 5/1997 | Rosenberg et al. ............. 285/81 |
| D390,095 | S | | 2/1998 | Spear et al. |
| D390,315 | S | | 2/1998 | Spear et al. |
| D395,111 | S | | 6/1998 | Spear et al. |
| 5,951,063 | A | * | 9/1999 | Szabo .......................... 285/303 |
| 6,869,110 | B2 | * | 3/2005 | Okada et al. .................. 285/319 |
| 6,913,294 | B2 | * | 7/2005 | Treverton et al. ............. 285/406 |
| 2002/0053797 | A1 | * | 5/2002 | Vierneisel et al. ............ 285/305 |
| 2009/0121067 | A1 | * | 5/2009 | Arcati et al. .................. 242/395 |

OTHER PUBLICATIONS

Amazon.Com—Advertisement, Image of Suncast SHA150B 150-Foot Capacity Garden Hose, Jul. 22, 2010, 1 page.
Amazon.Com—Advertisement, Image of Suncast HRC200 Hosemobile 225-Foot Hose Reel Cart, Jul. 22, 2010, 1 page.

* cited by examiner

*Primary Examiner* — Kevin Murphy
(74) *Attorney, Agent, or Firm* — Eckert Seamans Cherin & Mellott, LLC; David C. Jenkins (57) ABSTRACT

An inlet conduit assembly for a hose reel assembly includes a clip assembly that is structured to be accessible from the outer side of the frame assembly. The clip assembly is structured to be operated without the use of tools. The clip assembly, essentially, prevents the inlet conduit assembly from being moved axially once installed. In this configuration, a user may quickly and easily actuate the clip assembly to release or engage the inlet conduit assembly. Thus, a user may quickly and easily remove the inlet conduit assembly.

8 Claims, 5 Drawing Sheets

POLY-METAL HOSE REEL WATER SYSTEM

CROSS REFERENCE TO RELATED APPLICATION

This application is a Continuation-In-Part Application of U.S. Ser. No. 12/270,891, filed Nov. 14, 2008, which claims priority to U.S. Provisional Patent Application Ser. No. 61/002,997, filed Nov. 14, 2007 entitled Metal Hose Reel Water System.

BACKGROUND OF THE INVENTION

1. Field of the Invention

This invention relates to hose reels and, more specifically, to an inlet assembly that may be easily accessed.

2. Background Information

A hose reel typically includes a portable frame assembly that supports a basket assembly. The basket assembly has a central barrel and two end hubs. The basket assembly is structured to have a hose wound thereabout and is rotatably coupled to the frame assembly. The basket assembly also includes one or more conduits structured to couple an external hose to the basket assembly hose. One conduit, the basket assembly conduit, has an inlet end disposed along the axis of rotation of the basket assembly and includes a distal end that extends through the barrel body so that the basket hose may be coupled thereto. The basket assembly conduit rotates with the basket. A second conduit, the inlet conduit, provides the connection with the external supply hose. The inlet conduit has a first end and a second end. The second end is structured to be disposed within the basket assembly conduit inlet end and is disposed along the axis of rotation of the basket assembly. The inlet conduit first end extends from the basket assembly, and may extend from the frame assembly, and is structured to be coupled to the external hose. Typically, the inlet conduit first end extends at generally a right angle to the inlet conduit second end. The inlet conduit second end is disposed within the basket conduit thereby creating a passage for water extending from the external hose, through the inlet conduit, through the basket assembly conduit and into the basket assembly hose. To resist water leakage, the inlet conduit second end typically includes one or more resilient O-rings structured to engage the inner surface of the basket assembly conduit.

When the basket assembly hose is being wound about the barrel, the basket assembly conduit rotates with the basket about the axis of rotation and the inlet conduit remains substantially stationary. In this configuration, the O-rings are subject to wear and tear as the O-rings are the elements at the interface between the inlet conduit and the basket assembly conduit. As such, a hose reel is typically structured to allow a user to separate the inlet conduit and the basket assembly conduit by allowing the inlet conduit to be removed. Once removed, the user can access the inlet conduit O-rings for replacement. The hose reel, however, must also include a device for maintaining the inlet conduit and the basket assembly conduit in place during normal usage.

Various coupling devices are known in the prior art. Initially, the coupling devices were not structured to allow the user to separate the inlet conduit from the basket assembly conduit. Such coupling devices were typically snap clips structured to couple the inlet conduit to the hose reel frame assembly and substantially restrict the motion of the inlet conduit. As manufacturers learned that users desired to replace damaged O-rings, removable clips came into use. These clips, however, have been disposed in difficult to access locations, e.g., between a basket assembly hub and the frame assembly. Such coupling devices typically required the use of two hands and/or the use of tools to disengage.

SUMMARY OF THE INVENTION

An inlet conduit assembly for a hose reel assembly as recited in the claims below includes a clip assembly that is structured to be accessible from the outer side of the frame assembly. Further, the clip assembly is structured to be operated without the use of tools. In this configuration, a user may quickly and easily actuate the clip assembly to release or engage the inlet conduit. Thus, a user may quickly and easily remove the inlet conduit so that the O-rings may be replaced or for other reasons. Further, when the user wished to install the inlet conduit, the installation is also easily accomplished.

In one embodiment, the clip assembly includes a pivoting clip body having a clip structure that is, preferably, two pincer-like fingers. The body is coupled to the hose reel frame assembly and structured to pivot. The clip structure fingers extend in the same general plane that the clip body pivots in. The inlet conduit, which is preferably a circular tube, includes a retaining clip groove extending at least partially circumferentially thereabout. When the inlet conduit is fully inserted into the basket assembly conduit, the retaining clip groove is disposed in the plane of the clip body rotation. Thus, the clip body may be pivoted between a first position, wherein the clip structure does not engage the inlet conduit body retaining clip groove, and a second position, wherein the clip structure engages the inlet conduit body retaining clip groove. When the clip structure engages the inlet conduit body retaining clip groove, the inlet conduit is, essentially, prevented from being moved axially. That is, when the clip structure engages the inlet conduit body retaining clip groove the inlet conduit and the basket assembly conduit form a passage from the lateral side of the hose reel to a basket surface outlet.

BRIEF DESCRIPTION OF THE DRAWINGS

A full understanding of the invention can be gained from the following description of the preferred embodiments when read in conjunction with the accompanying drawings in which.

DESCRIPTION OF THE PREFERRED EMBODIMENTS

As used herein, "coupled" means a link between two or more elements, whether direct or indirect, so long as a link occurs.

As used herein, "directly coupled" means that two elements are directly in contact with each other.

As used herein, "fixedly coupled" or "fixed" means that two components are coupled so as to move as one while maintaining a constant orientation relative to each other. The fixed components may, or may not, be directly coupled.

As used herein, the word "unitary" means a component is created as a single piece or unit. That is, a component that includes pieces that are created separately and then coupled together as a unit is not a "unitary" component or body.

As used herein, "temporarily coupled" means that two components are coupled in a manner that allows for the components to be easily decoupled without damaging the components.

As used herein, "correspond" indicates that two structural components are sized to engage each other with a minimum amount of friction. Thus, an opening which corresponds to a member is sized slightly larger than the member so that the member may pass through the opening with a minimum amount of friction.

Figure 1:
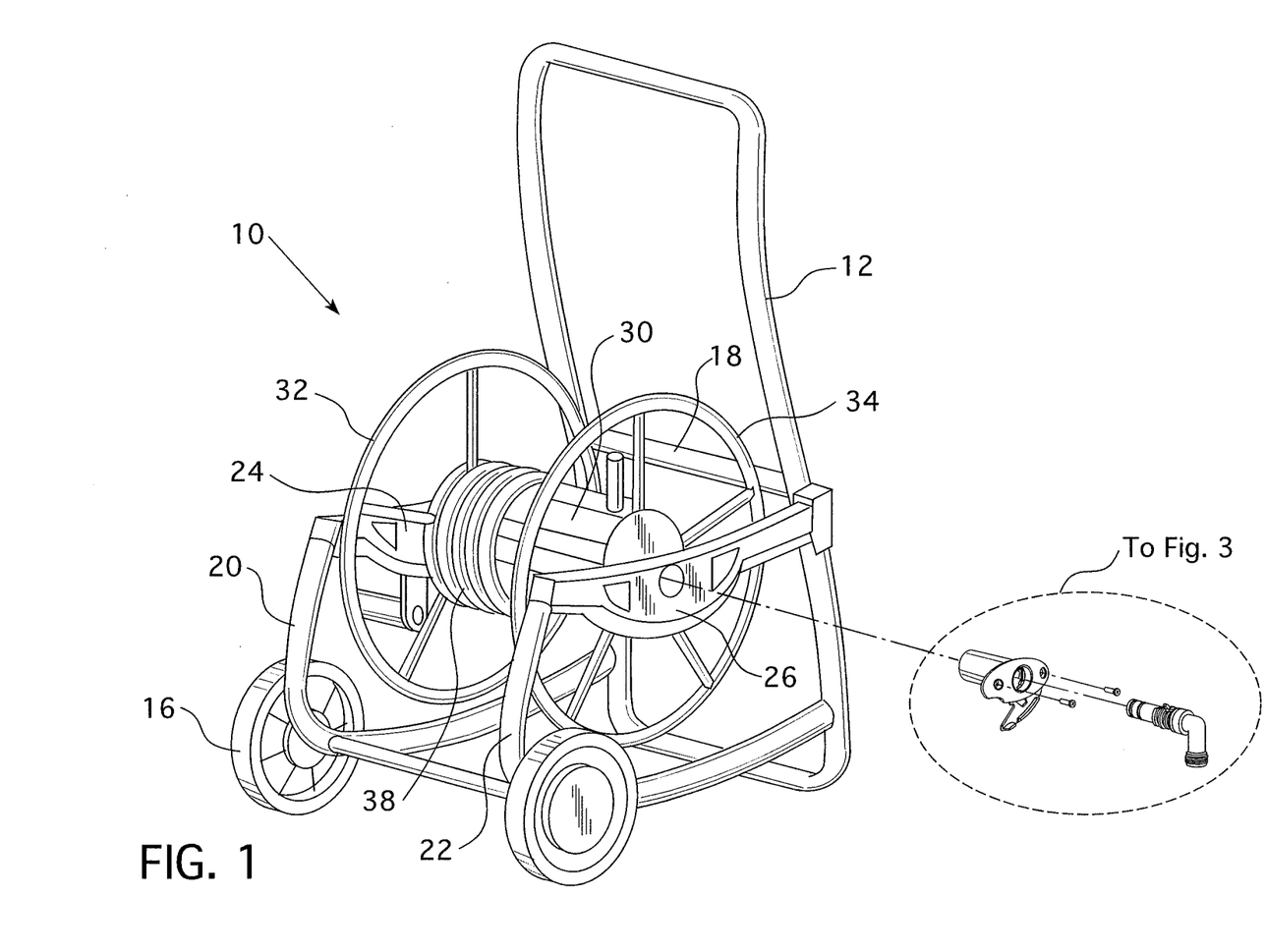
FIG. 1 is an isometric view of a hose reel assembly.

As shown in FIG. 1, a hose reel assembly 10 includes a frame assembly 12 and a basket assembly 14. The frame assembly 12 is structured to rotatably support the basket assembly 14. The frame assembly 12 is, preferably, portable and includes a pair of wheels 16. Preferably, the frame assembly 12 includes a plurality of members 18 forming a frame 20, 22 on each lateral side of the basket assembly 14. The frames 20, 22 are held in a spaced relation by additional frame members 18. The area between the frames 20, 22 defines the frame assembly inner side 24. The other side of the frames 20, 22 defines the frame assembly outer side 26, or lateral sides.

The basket assembly 14 includes a barrel 30, two hubs 32, 34, and a basket assembly conduit 36. The basket assembly 14 is structured to support a basket assembly hose 38. The barrel 30 is, preferably, a cylindrical body 40 having an outer surface 42. The barrel 30, preferably, has a diameter several times larger than the diameter of the basket assembly hose 38. The basket assembly hubs 32, 34 are each disposed on, and are coupled to, a lateral side of the barrel 30. The basket assembly hubs 32, 34 are further rotatably coupled to the frame assembly 12. The hubs 32, 34 define the usable storage space for the basket assembly hose 38 about the barrel 30. The basket assembly 14 is rotatably coupled to the frame assembly 12 and has an axis of rotation extending generally along the longitudinal axis of the barrel body 40. The axis of rotation of the basket assembly 14 is typically horizontal and typically extends laterally relative to the frame assembly 12.

Figure 2:
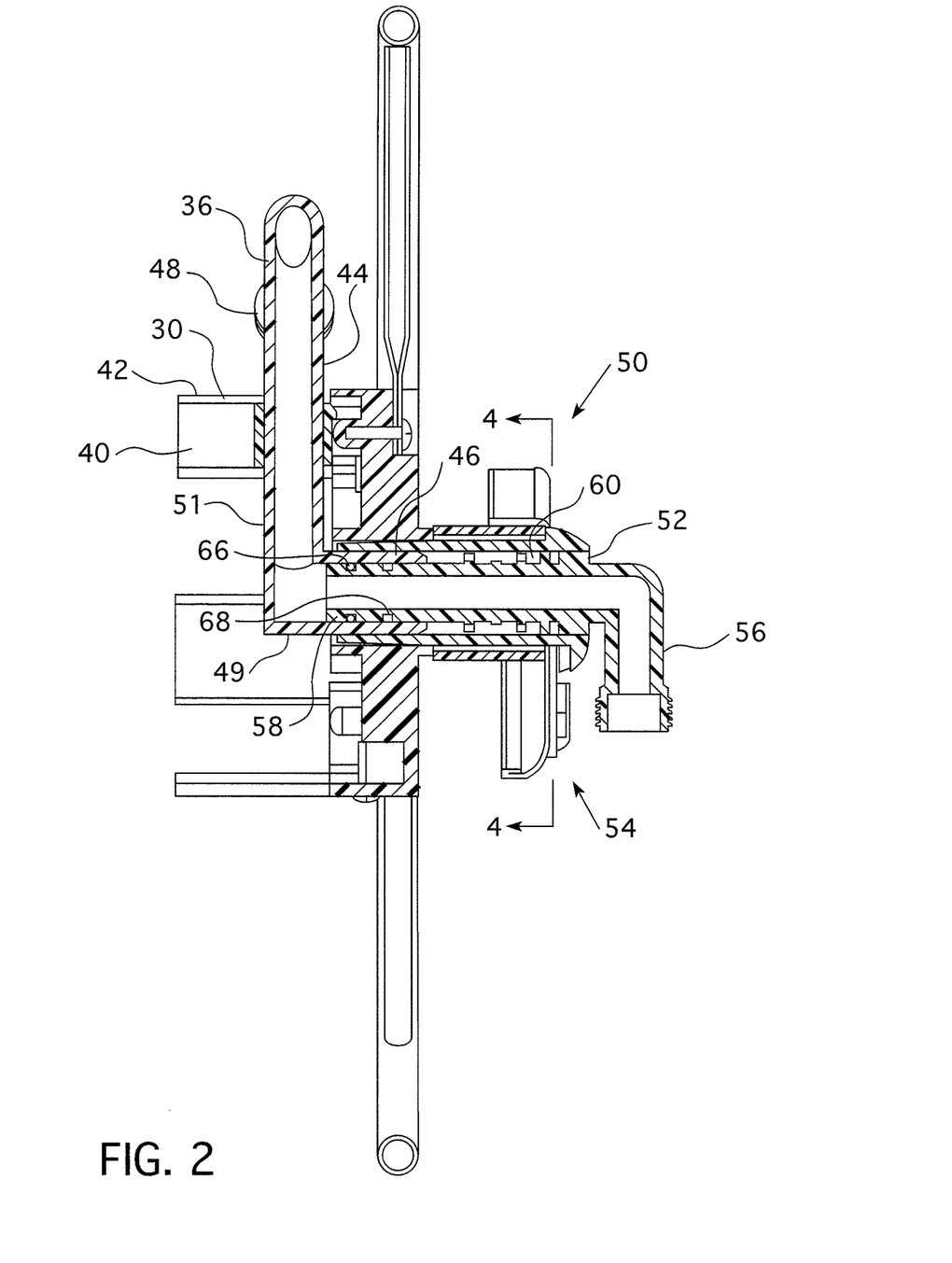
FIG. 2 is a side cross-sectional view of an inlet conduit assembly coupled to a hose reel.

As shown in FIG. 2, the barrel 30 is also substantially hollow. The basket assembly conduit 36 includes a preferably cylindrical, hollow, L-shaped body 44, an inlet end 46 and an outlet end 48. The basket assembly conduit body 44 also includes an axially extending portion 49 and a radially extending portion 51. The basket assembly conduit body 44 is disposed substantially within the basket assembly conduit body 44 with the basket assembly conduit body axially extending portion 49 being disposed substantially along the axis of rotation of the basket assembly 14. The basket assembly conduit body radially extending portion 51 extends through the barrel outer surface 42. The basket assembly conduit outlet end 48 is disposed at the outer end of the basket assembly conduit body radially extending portion 51 and is structured to be coupled to the basket assembly hose 38. That is, the basket assembly conduit outlet end 48 preferably includes threads or another such hose coupling device. The basket assembly conduit inlet end 46 is disposed at the distal end of the basket assembly conduit body axially extending portion 49 and is located at, or adjacent to, a lateral side of the barrel 30.

The basket assembly 14 further includes an inlet conduit assembly 50 that includes a generally cylindrical, elongated body 52 and a clip assembly 54. The inlet conduit assembly body 52 has a first end 56, a second end 58, and a retaining clip groove 60. The retaining clip groove 60 extends at least partially circumferentially about the inlet conduit body 52. The inlet conduit body first end 56 preferably includes about a ninety degree bend. The inlet conduit body first end 56 is structured to be coupled to an external hose (not shown). That is, the inlet conduit body first end 56 preferably includes threads or another such hose coupling device. The inlet conduit body second end 58 is sized to fit within the basket assembly conduit inlet end 46. The inlet conduit body second end 58 further includes at least one, and preferably two, O-ring grooves 62, 64. An O-ring 66, 68 is disposed in each O-ring groove 62, 64.

Figure 3:
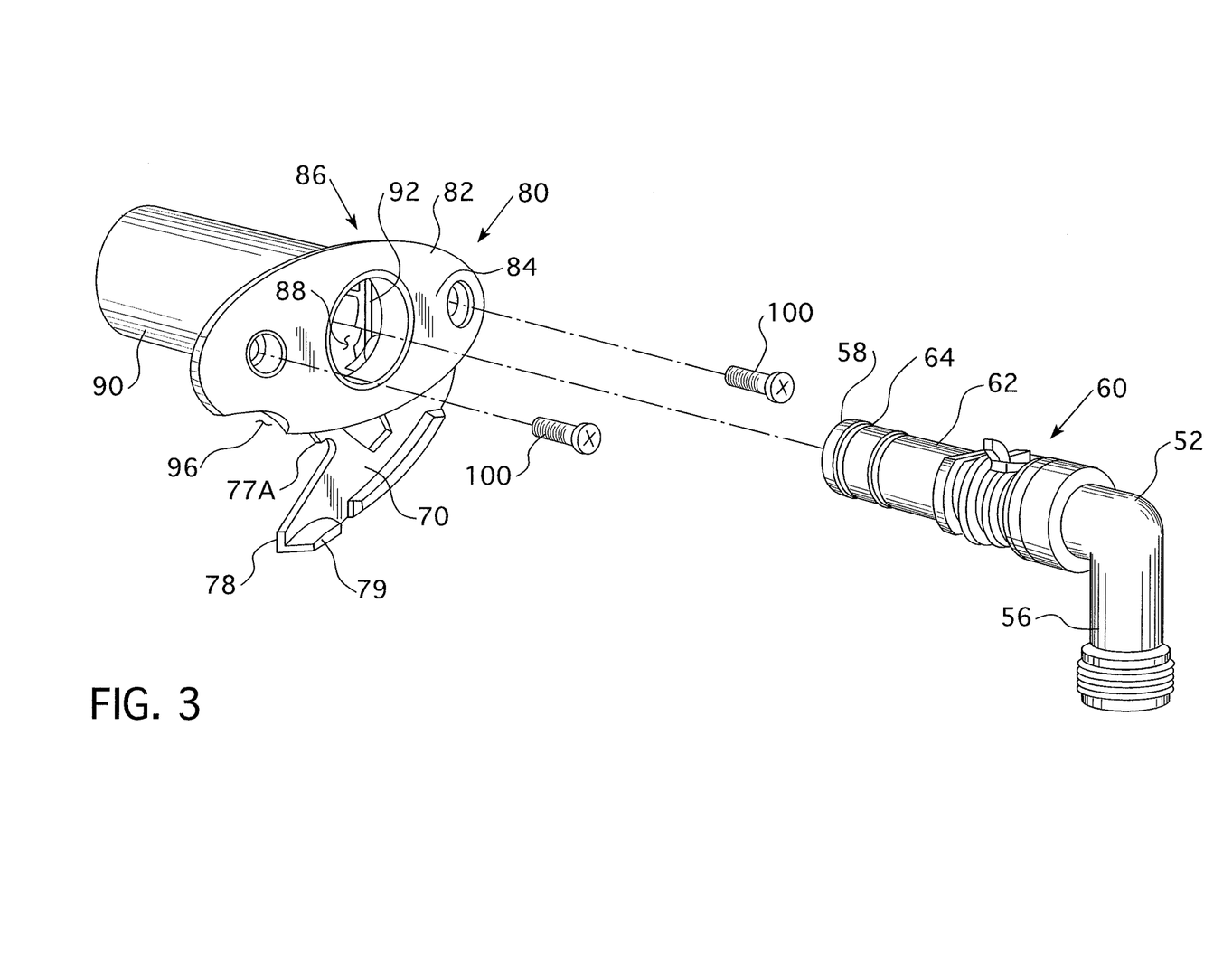
FIG. 3 is an exploded isometric view of an inlet conduit assembly.
Figure 4:
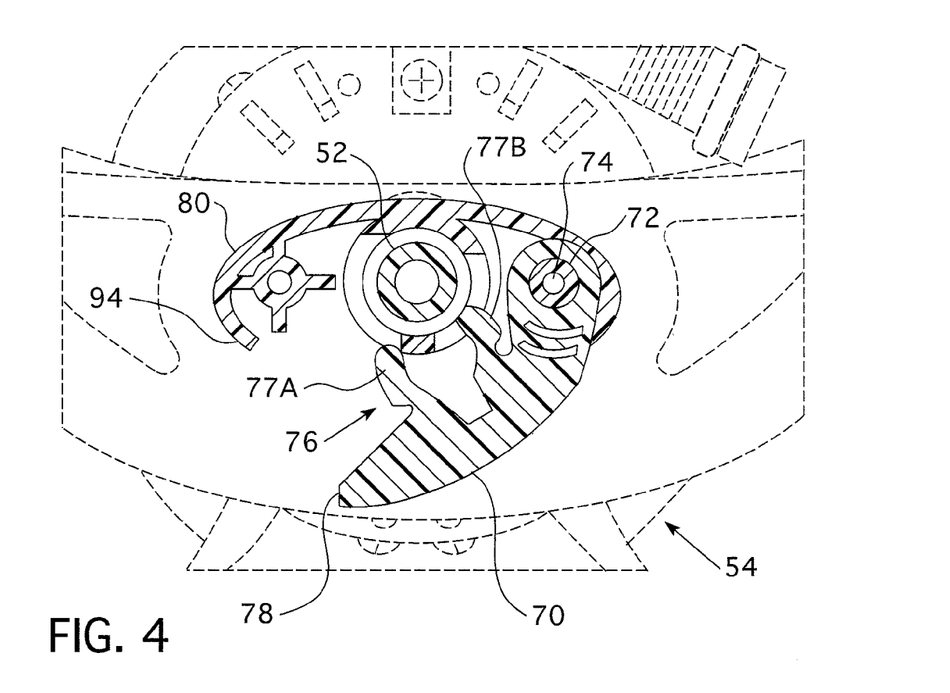
FIG. 4 is a front cross-sectional view of a clip assembly.

As shown in FIGS. 3 and 4, the clip assembly 54 includes an elongated body 70 and a shroud assembly 80. The clip assembly body 70 has a first end 72, a pivot point 74, a clip structure 76, and a second end 78. Preferably, the pivot point 74 is disposed at, or adjacent to, the clip assembly body first end 72. The clip assembly body 70 is pivotally coupled to the hose reel frame assembly 12 and, more specifically, the clip assembly body 70 is pivotally coupled to the shroud assembly 80. The clip structure 76, as shown, includes a pair of elongated, spaced, flexible fingers 77A, 77B that act as a retaining member 75. To resist axial movement of the inlet conduit body 52 the retaining member 75 is structured to be disposed in the inlet conduit assembly retaining clip groove 60. Thus, the retaining member 75 could be a single finger 77A or a similar structure. When a pair of elongated, spaced, flexible fingers 77A, 77B, or an equivalent retaining member 75, are used, the fingers 77A, 77B are spaced apart from each other a distance about the same as the diameter of the inlet conduit body 52 at the inlet conduit body retaining clip groove 60. Thus, the clip structure 76 is structured to engage, that is, fit snugly about, the inlet conduit body retaining clip groove 60. Further, the clip assembly body 70 is structured to move within a plane. The fingers 77A, 77B extend generally within the clip assembly body 70 plane of motion. Further, the clip assembly body 70 preferably includes a thumb tab 79 or a similar actuator. The thumb tab 79 is preferably disposed at, or adjacent to, the clip assembly body second end 78, or otherwise generally on the opposite side of the clip assembly body 70 from the clip assembly pivot point 74. The thumb tab 79 is a ridge or extension that extends out of the clip assembly body 70 plane of motion.

The shroud assembly 80 may be formed integrally with, that is, molded as part of, the frame assembly 12 or as a separate assembly as shown. Regardless of whether the shroud assembly 80 is integral or separate, the shroud assembly 80 includes a generally planar body 82 with a front side 84, a back side 86, an opening 88 and a generally tubular extension 90. The shroud assembly body 82 is structured to be coupled to the frame assembly 12 adjacent to the basket assembly conduit inlet end 46 and, more preferably, with the axis of the tubular extension 90 aligned with the basket assembly body 40 axis of rotation. The tubular extension 90 extends from the shroud body back side 86 and aligned and in fluid communication with the shroud body opening 88. The tubular extension 90 includes at least one, and in the disclosed embodiment, two clip structure passages 92. The tubular extension clip structure passages 92 are structured to allow the clip structure 76, that is the fingers 77A, 77B, to pass through the tubular extension 90. The shroud assembly body 82 also includes a stop member 94 which is disposed generally opposite the location where the clip assembly body 70 is pivotally coupled to the shroud assembly body 82, as described below. The shroud assembly body 82 may include a notch 96, or similar opening, structured to allow the thumb tab 79 to extend outwardly therefrom as described below.

The inlet conduit assembly 50 is assembled as follows. The clip assembly body 70 is pivotally coupled to the shroud assembly body 82. Preferably, the clip assembly body first end 72 is pivotally coupled to the shroud assembly body back side 86. The clip assembly body 70 travels in a plane aligned with the tubular extension clip structure passages 92. In this configuration, the clip assembly body 70 may pivot relative to the shroud assembly body 82 and move the fingers 77A, 77B through the tubular extension clip structure passages 92. When the fingers 77A, 77B are disposed through the tubular extension clip structure passages 92, the clip assembly body second end 78 contacts the shroud assembly body stop member 94. Further, the thumb tab 79 extends, typically through the shroud assembly body notch 96, outwardly beyond the shroud assembly body front side 84.

The shroud assembly 80 is then coupled to the frame assembly 12. Preferably, the shroud assembly 80 is adjacent to the basket assembly conduit inlet end 46 and, more preferably, with the axis of the tubular extension 90 aligned with the basket assembly body 40 axis of rotation. The tubular extension 90 may be sized to fit about the basket assembly conduit body axially extending portion 49 and may be disposed about the basket assembly conduit inlet end 46. The shroud assembly 80 may be coupled to the frame assembly by fasteners 100, a clip structure (not shown), or any other common means.

In this configuration, the inlet conduit body 52 may be removably installed as follows. The clip assembly body 70 is pivoted to a first position, wherein the clip structure 76 does not engage the inlet conduit body retaining clip groove 60 and does not extend through the tubular extension clip structure passages 92. The inlet conduit body second end 58 is passed through the shroud assembly body opening 88 and the tubular extension 90. The inlet conduit second end 58 then engages, that is, moves into the basket assembly conduit inlet end 46 and is pivotally coupled thereto. At this point, the inlet conduit second end 58 is partially disposed in the basket assembly conduit body axially extending portion 49 and the O-rings 66, 68 sealingly engage the inlet conduit second end 58. Thus, a fluid passage exists from outside the frame assembly 12, through the inlet conduit body 52, through the basket assembly conduit 36, to the outer side of the barrel 30.

However, to maintain the inlet conduit body 52 in this position, the inlet conduit body 52 must be prevented from moving axially. The inlet conduit body 52 is prevented from moving axially by the clip assembly 54. That is, when the inlet conduit body 52 is fully installed, the inlet conduit body retaining clip groove 60 is disposed, generally, within the clip assembly body 70 plane of motion. Thus, the clip assembly body 70 may be moved to a second position wherein the clip structure 76 engages the inlet conduit body retaining clip groove 60. That is, the clip assembly body 70 is pivoted about the pivot point 74 until the fingers 77A, 77B pass through the tubular extension clip structure passages 92 and engage the inlet conduit body retaining clip groove 60. It is noted that the stop member 94 contacts the clip assembly body second end 78 when the clip assembly body 70 is in the second position. In this configuration, the inlet conduit body 52 is, essentially, prevented from moving axially.

Removal of the inlet conduit body 52 is accomplished by returning the clip assembly body 70 to the first position and pulling the inlet conduit body 52 axially until the inlet conduit body 52 has moved out of the shroud assembly 80. It is noted that the movement of the clip assembly body 70 is accomplished easily by a user who engages the thumb tab 79 by hand. That is, there are no tools required to install or remove the inlet conduit body 52 and to move the clip structure 76 into, or from, engagement with the inlet conduit body 52. It is further noted that because the shroud assembly 80 is coupled to the outer side of the frame assembly 12, the thumb tab 79 is easily accessed. That is, a user does not have to remove components of the frame assembly 12 or the basket assembly 14 in order to access the clip structure 76.

Figure 5:
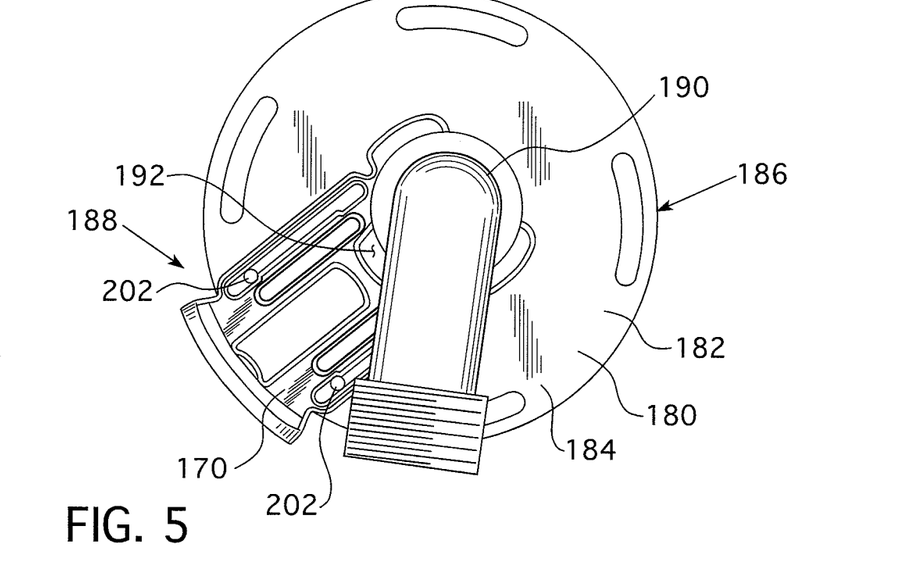
FIG. 5 is a side view of an alternate embodiment.

Another embodiment of the clip assembly 154 is shown in FIG. 5. This embodiment of the clip assembly 154 has a reduced number of components and/or is simplified thereby requiring less complex components. Broadly, the clip assembly 154 still includes an elongated body 170 and a shroud assembly 180. The clip body 170, however, is not pivotally coupled to another component and, as such, does not require a pivot point. Thus, the clip assembly body 170 has a first end 172, a clip structure 176, and a second end 178, with the second end 178 defining the clip structure 176. That is, the clip structure 176, as shown, includes a pair of elongated, spaced, flexible fingers 177A, 177B that act as the retaining member 175. To resist axial movement of the inlet conduit body 52 the retaining member 175 is structured to be disposed in the inlet conduit assembly retaining clip groove 60. Thus, the retaining member 175 could be a single finger 177A or a similar structure.

When a pair of elongated, spaced, flexible fingers 177A, 177B, or an equivalent retaining member 175, are used, the fingers 177A, 177B are shaped to correspond to the size and shape of the inlet conduit assembly retaining clip groove 60. That is, preferably, the fingers 177A, 177B define a generally circular inner perimeter spaced apart from each other a distance about the same as the diameter of the inlet conduit body 52 at the inlet conduit body retaining clip groove 60. Further, due to the resilient nature of the clip structure 176, the fingers 177A, 177B may be spaced a distance slightly smaller than the inlet conduit assembly retaining clip groove 60.

In this configuration, the clip structure 176 is structured to engage, that is, fit snugly about, the inlet conduit body retaining clip groove 60. Further, the clip assembly body 170 is structured to move within a plane. The fingers 177A, 177B extend generally within the clip assembly body 170 plane of motion. Further, the clip assembly body 170 preferably includes a thumb tab 179 or a similar actuator. The thumb tab 179 is preferably disposed at, or adjacent to, the clip assembly body first end 172, or otherwise generally on the opposite side of the clip assembly body 170 from the clip structure 176. The thumb tab 179 is a ridge or extension that extends out of the clip assembly body 170 plane of motion.

The shroud assembly 180, shown in FIG. 5, may be formed integrally with, that is, molded as part of, the frame assembly 12 or as a separate assembly as shown. Regardless of whether the shroud assembly 180 is integral or separate, the shroud assembly 180 includes a generally planar body 182 with a front side 184, a back side 186, with a thickness therebetween, an opening 188 and a generally tubular extension 190. The thickness of the shroud assembly body 182 is at least as thick as, i.e. as tall as, opposed to long or wide, the clip assembly body 170 and, more preferably, slightly thicker than the clip assembly body 170. More preferably, the shroud assembly body 182 in this embodiment is disk shaped and structured to be disposed about the basket assembly conduit body axially extending portion 49. The shroud assembly body 182 further includes an elongated passage 192. The shroud assembly passage 192 is a generally radial passage disposed in a plane aligned with the inlet conduit body retaining clip groove 60. That is, the longitudinal axis of the shroud assembly body passage 192 extends generally radially from the axis of rotation of the barrel body 40.

The shroud assembly body 182 is structured to be coupled to the frame assembly 12 adjacent to the basket assembly conduit inlet end 46 and, more preferably, with the axis of the tubular extension 190 aligned with the basket assembly body 40 axis of rotation. The clip assembly body 170 is disposed in the shroud assembly body passage 192 and is structured to move between a first position, wherein the clip structure 176 does not engage said inlet conduit body retaining clip groove 60, and a second position, wherein the clip structure 176 engages the inlet conduit body retaining clip groove 60. The clip structure 176, and more specifically the clip assembly body 170 moves longitudinally in the shroud assembly body passage 192. As with the embodiment discussed above, the retaining member 175, which is preferably the fingers 177A, 177B, engages the inlet conduit body retaining clip groove 60. Further, in this configuration, the thumb tab 179, preferably, extends out of the plane of the shroud assembly body 182.

Figure 6:
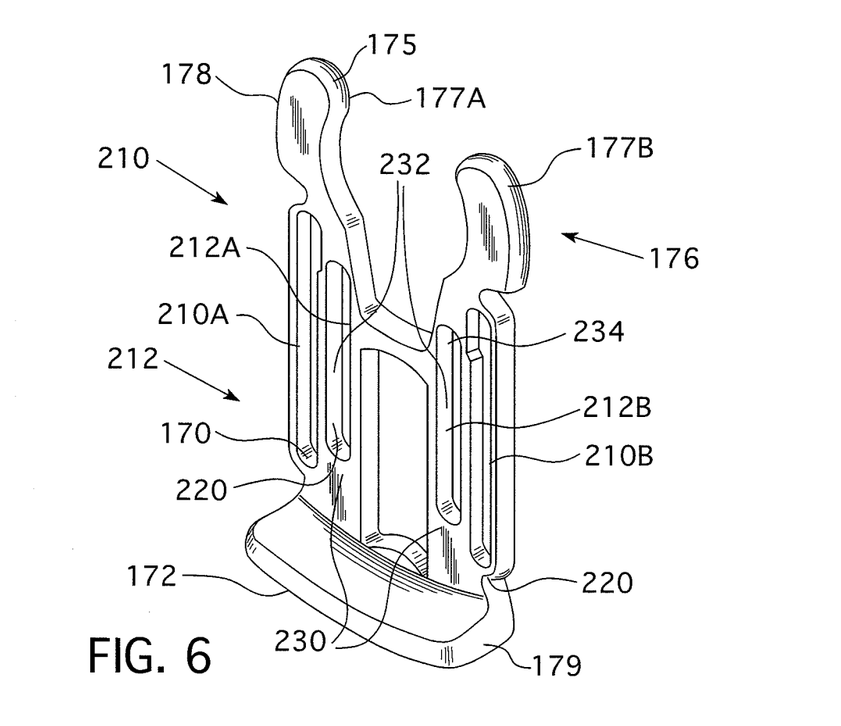
FIG. 6 is an isometric view of the alternate clip member.

As shown in FIGS. 5 and 6, the clip assembly body 170 has at least one elongated, longitudinal channel 200 thereon. There is a corresponding at least one lug 202 (FIG. 5) extending into the shroud assembly body passage 192. The at least one lug 202 is structured to guide the clip assembly body 170 toward the inlet conduit body retaining clip groove 60. Thus, the least one lug 202 may have elongated sides (not shown) extending parallel to the longitudinal axis of the clip assembly body 170. In this configuration (not shown), the elongated sides of the least one lug 202 engage the sides of the clip assembly body channel 200. This engagement generally maintains the orientation of the clip assembly body 170 within the shroud assembly body passage 192. Thus, the shroud assembly at least one lug 202 defines the clip assembly body 170 path of travel.

In the preferred embodiment, the clip assembly body at least one longitudinal channel 200 includes a pair of associated, substantially parallel, and immediately adjacent channels 210, 212. As the two clip assembly body channels 210, 212 are immediately adjacent each other, the portion of the clip assembly body 170 between the channels 210, 212 is a flexible member 220. The two clip assembly body channels 210, 212 include a guide channel 210 and a relief channel 212. The shroud assembly at least one lug 202 is positioned to be disposed in the guide channel 210 when the clip assembly body 170 is disposed in the shroud assembly body passage 192. Further, the shroud assembly at least one lug 202 has a width that is greater than the width of at least a portion of the guide channel 210. Thus, as the clip assembly body 170 moves between the first position and the second position, the at least one lug 202 frictionally engages the flexible member 220. This engagement causes the flexible member 220 to flex away from the at least one lug 202 and into the relief channel 212.

Further, the guide channel 210 has a first end 230, a medial portion 232, and a second end 234. The guide channel first end 230 and second end 234 are sized to correspond to the shroud assembly body at least one lug 202. The guide channel medial portion 232 is slightly less wide than the at least one lug 202. The guide channel 210 has a length, and is positioned on the clip assembly body 170, so that when the clip assembly body 170 is in the first position, the shroud assembly at least one lug 202 is disposed at the guide channel first end 230. Similarly, when the clip assembly body 170 is in the second position, the shroud assembly at least one lug 202 is disposed at the guide channel second end 234. In this configuration, the shroud assembly body at least one lug 202 frictionally engages the flexible member 220 when the shroud assembly body at least one lug 202 is in the guide channel medial portion 232. However, the shroud assembly body at least one lug 202 does not frictionally engage the guide channel first end 230 and second end 234. It is further noted that, due to the flexible nature of the flexible member 220, as the clip assembly body 170 moves into either the first or second positions, wherein the shroud assembly body at least one lug 202 is disposed at one of the guide channel ends 230, 234, the bias of the flexible member 220 engaging the shroud assembly body at least one lug 202 is released. This has the effect of "snapping" the clip assembly body 170 into either the first or second position.

In a more preferred embodiment, the clip assembly body at least one longitudinal channel 200 includes two pairs of substantially parallel, and immediately adjacent channels 210A, 212A, 210B, 212B. The pairs of channels 210A, 212A, 210B, 212B each include a guide channel 210A, 210B and a relief channel 212A, 212B. The pairs of channels 210A, 212A, 210B, 212B are, preferably, disposed on opposite sides to the longitudinal axis of the clip assembly body 170. As there are two guide channels 210A, 210B, there are also two shroud assembly body lugs 202A, 202B. As before, the lugs 202A, 202B are positioned on the shroud assembly body 182 so that, when the clip assembly body 170 is disposed in the shroud assembly body passage 192, each lug 202A, 202B is disposed in the associated guide channel 210A, 210B. The pairs channels 210A, 212A, 210B, 212B are in other respects substantially similar to the single pair of channels 210, 212 described above. Although a specific description does not follow, it is understood that the pairs channels 210A, 212A, 210B, 212B have substantially similar elements as the single pair of channels 210, 212 described above and those elements may be identified by the same reference numbers with addition of the letters "A" or "B." For example, if necessary first end of the guide channel 210A may be identified by reference number 230A.

While specific embodiments of the invention have been described in detail, it will be appreciated by those skilled in the art that various modifications and alternatives to those details could be developed in light of the overall teachings of the disclosure. For example, as set forth above, the inlet conduit second end 58 is disposed within the basket assembly conduit inlet end 46 and the O-rings 66, 68 are disposed on the outer side of the inlet conduit second end 58. It is understood that such an arrangement could be configured with the O-rings 66, 68 disposed about the basket assembly conduit inlet end 46 and the basket assembly conduit inlet end 46 could be structured to fit inside the inlet conduit second end 58. Accordingly, the particular arrangements disclosed are meant to be illustrative only and not limiting as to the scope of invention which is to be given the full breadth of the claims appended and any and all equivalents thereof.

What is claimed is:

1. An inlet conduit assembly for a hose reel assembly, said hose reel assembly having a frame assembly and a basket assembly, said frame assembly having an inner side and an outer side, said frame assembly structured to support said basket assembly, said basket assembly structured to support a hose and having a basket body with an outer surface and a lateral side, a basket assembly conduit having an inlet end and an outlet end and extending within said basket body, said basket assembly conduit inlet end disposed at said basket body lateral side and said basket assembly conduit outlet end disposed at said basket body outer surface, said inlet conduit assembly comprising:
   a generally cylindrical, elongated body with first end, a second end, and a retaining clip groove extending at least partially circumferentially about said inlet conduit body, said inlet conduit second end sized to fit within said basket assembly conduit inlet end;
   a clip assembly including an elongated body and a shroud assembly;

said clip assembly body having a first end, a medial portion, and a second end said second end defining a clip structure;
said shroud assembly having a body defining an elongated passage, said shroud assembly passage disposed in a plane aligned with said inlet conduit body retaining clip groove;
wherein said clip assembly body moves between a first position, wherein said clip structure does not engage said inlet conduit body retaining clip groove, and a second position, wherein said clip structure engages said inlet conduit body retaining clip groove;
wherein said clip structure includes a retaining member structured to be disposed in said inlet conduit body retaining clip groove;
wherein said clip structure retaining member extends in the plane of motion of said clip assembly body;
said shroud assembly has a generally planar body with a front side, a back side, and an opening;
said shroud body coupled to said hose reel assembly frame assembly;
said shroud assembly body includes at least one lug extending into said shroud assembly body passage;
said clip assembly body having at least one elongated, longitudinal channel thereon;
wherein said shroud assembly at least one lug defines the clip assembly body path of travel;
wherein said clip assembly body at least one longitudinal channel includes two substantially parallel channels;
said clip assembly body channels are disposed immediately adjacent each other, whereby the portion of said clip assembly body between said channels is a flexible member;
one said clip assembly body channel is a guide channel, in which said shroud assembly body at least one lug is disposed;
the other said clip assembly body channel is a relief channel; and
said shroud assembly body at least one lug has a width that is greater than the width of said guide channel, whereby, as said clip assembly body moves between said first position and said second position, said at least one lug frictionally engages said flexible member.

2. The inlet conduit assembly of claim 1 wherein:
said guide channel has first end, a medial portion, and a second end;
said guide channel first end and second end are sized to correspond to said shroud assembly body at least one lug; and
whereby said shroud assembly body at least one lug frictionally engages said flexible member when said shroud assembly body at least one lug is in said guide channel medial portion.

3. The inlet conduit assembly of claim 2 wherein:
said shroud assembly body at least one lug includes two lugs;
said clip assembly body at least one longitudinal channel includes four substantially parallel channels, two channels being guide channels, two channels being relief channels, each said relief channel disposed adjacent to, and associated with, a guide channel;
each said pair of guide channels and relief channels forming a flexible member therebetween; and
each said shroud assembly body lug disposed in one said guide channel.

4. The inlet conduit assembly of claim 1 wherein:
said shroud assembly body at least one lug includes two lugs;
said clip assembly body at least one longitudinal channel includes four substantially parallel channels, two channels being guide channels, two channels being relief channels, each said relief channel disposed adjacent to, and associated with, a guide channel;
each said pair of guide channels and relief channels forming a flexible member therebetween; and
each said shroud assembly body lug disposed in one said guide channel.

5. A hose reel assembly comprising:
a frame assembly, a basket assembly, and an inlet conduit assembly;
said frame assembly having an inner side and an outer side, said frame assembly structured to support said basket assembly:
said basket assembly structured to support a hose and having a basket body with an outer surface, a lateral side, and an inlet conduit assembly:
a basket assembly conduit having an inlet end and an outlet end, said basket assembly conduit inlet end disposed at said basket body lateral side and said basket assembly conduit outlet end disposed at said basket body outer surface;
said inlet conduit assembly including an inlet conduit body and a clip assembly;
said inlet conduit body being a generally cylindrical, elongated body with first end, a second end, and a retaining clip groove extending at least partially circumferentially about said inlet conduit body, said inlet conduit second end sized to fit within said basket assembly conduit inlet end;
said clip assembly including an elongated body and a shroud assembly;
said clip assembly body having a first end, a medial portion, and a second end, said second end being a clip structure;
said shroud assembly having a body defining an elongated passage, said shroud assembly passage disposed in a plane aligned with said inlet conduit body retaining clip groove;
wherein said clip assembly body moves between a first position, wherein said clip structure does not engage said inlet conduit body retaining clip groove, and a second position, wherein said clip structure engages said inlet conduit body retaining clip groove;
wherein said clip structure includes a retaining member structured to be disposed in said inlet conduit body retaining clip groove:;
wherein said clip structure retaining member extends in a plane parallel to the plane of motion of said clip assembly body;
said shroud assembly body including at least one lug extending into said shroud assembly passage;
said clip assembly body having at east one elongated longitudinal channel thereon;
wherein said shroud assembly at least one lug defines the clip assembly body path of travel;
wherein said clip assembly body at least one longitudinal channel includes two substantially parallel channels;
said clip assembly body channels are disposed immediately adjacent each other, whereby the portion of said clip assembly body between said channels is a flexible member;

one said clip assembly body channel is a guide channel, is which said shroud assembly body at least one lug is disposed;

the other said clip assembly body channel is a relief channel; and said shroud assembly body at least one lug has a width that is greater than the width of said guide channel, whereby, as said clip assembly body moves between said first position and said second position, said lug frictionally engages said flexible member.

6. The hose reel assembly of claim 5 wherein:

said guide channel has first end, a medial portion, and a second end;

said guide channel first end and second end are sized to correspond to said shroud assembly body at least one lug; and whereby said shroud assembly body at least one lug frictionally engages said flexible member when said shroud assembly body at least one lug is in said guide channel medial portion.

7. The hose reel assembly of claim 6 wherein:

said shroud assembly body at least one lug includes two lugs;

said clip assembly body at least one longitudinal channel includes four substantially parallel channels, two channels being guide channels, two channels being relief channels, each said relief channel disposed adjacent to, and associated with, a guide channel;

each said pair of guide channels and relief channels forming a flexible member therebetween; and each said shroud assembly body lug disposed in one said guide channel.

8. The hose reel assembly of claim 5 wherein:

said shroud assembly body at least one lug includes two lugs;

said clip assembly body at least one longitudinal channel includes four substantially parallel channels, two channels being guide channels, two channels being relief channels, each said relief channel disposed adjacent to, and associated with, a guide channel;

each said pair of guide channels and relief channels forming a flexible member therebetween; and each said shroud assembly body lug disposed in one said guide channel.

\* \* \* \* \*